United States Patent
Burnham

[15] 3,700,186
[45] Oct. 24, 1972

[54] AUTOMATIC REWIND DEVICE FOR WEB HANDLING APPARATUS

[72] Inventor: William L. Burnham, Rochester, N.Y.

[73] Assignee: Eastman Kodak Company, Rochester, N.Y.

[22] Filed: June 29, 1971

[21] Appl. No.: 158,001

[52] U.S. Cl. ..............242/189, 200/61.13, 352/124
[51] Int. Cl.......B65h 59/38, B65h 63/02, G03b 1/04
[58] Field of Search............242/57, 189, 190, 75.51; 352/124, 173, 174; 226/11; 200/61.13–61.18

[56] References Cited

UNITED STATES PATENTS

| | | | |
|---|---|---|---|
| 3,003,710 | 10/1961 | Shiver, Sr. et al. | 242/190 |
| 3,026,057 | 3/1962 | Horimura | 242/190 |
| 3,184,130 | 5/1965 | Brayer et al. | 242/190 |
| 3,240,550 | 3/1966 | Mitchell et al. | 352/124 |

Primary Examiner—Leonard D. Christian
Attorney—W. H. J. Kline et al.

[57] ABSTRACT

A device for effecting automatic rewind in a web handling apparatus of the type having means for rotatably supporting a hub having a web of strip material wound thereon with the innermost end of the web anchored to the hub so that at least a portion of the web extends substantially radially from the hub when the web has been completely unwound therefrom. The device includes drive means having a first condition for unwinding the web from the hub and a second condition for rotating the hub to rewind the web thereabout. A first sensing means is actuatable by an increase in tension of the web to close a first switch and a second sensing means is actuatable by a portion of the web extending radially from the core to close a second switch. The drive means is placed in its second condition to rewind the web onto the hub in response to the simultaneous closure of the first and second switches.

7 Claims, 2 Drawing Figures

PATENTED OCT 24 1972

3,700,186

WILLIAM L. BURNHAM
INVENTOR.

BY Milton S. Sales
W. H. J. Kline
ATTORNEY

AUTOMATIC REWIND DEVICE FOR WEB HANDLING APPARATUS

BACKGROUND OF THE INVENTION

1. Field of the Invention

The present invention relates generally to rewinding apparatus, and more specifically to an automatic rewind mechanism for web handling apparatus.

2. Description of the Prior Art

In web handling apparatus such as motion picture projectors or the like, a web is normally transported from a supply reel, through an operating station such as an apertured film gate, and onto a take-up reel. In a motion picture projector, the apertured film gate is positioned along the optical axis of the projector, and a film pull-down claw mechanism is incorporated in the projector for intermittently advancing the film past the aperture one frame at a time for projection. After the entire length of film has been projected and wound on the take-up reel the operator normally manually connects the trailing end of the film to the supply reel, moves a lever to disconnect the drive system from the take-up reel and connected to the supply reel, and operates the projector to rewind the projected film from the take-up reel onto the supply reel.

Apparatus is known which eliminates the manual rewinding operations involved in such prior art motion picture projectors. In such apparatus, a web is transported therethrough in one direction for a specified operation, and, after the operation has been completed, the web is automatically reversed in direction and rewound onto the supply reel. One such apparatus for automatically rewinding a motion picture film is disclosed in coassigned U.S. Pat. No. 3,300,155, issued Jan. 24, 1967 in the name Robert J Roman. In that apparatus, the trailing end of the film is anchored to the hub of the supply reel so that, upon completion of the projection cycle, the portion of the film extending between the supply reel and the pull-down mechanism is tensioned. A device is provided for sensing the increase in the tension of such portion of the film and for shifting the projector mechanism to its rewind mode in response to such increase in tension. Mechanisms similar to the type disclosed in the Roman patent wherein the automatic rewind mechanism is engaged in response to an increase in web tension have proven to be highly reliable in commercial applications. However, such devices are subject to premature actuation of the rewind cycle should the tension in the reach of film between the supply reel and the pull-down mechanism momentarily increase beyond a critical value for any of a number of reasons such as for example either high inertial forces on the supply reel or reel "pick" (when the reel flanges momentarily catch the film to prevent smooth unwinding thereof). Therefore, it is desirable to provide means for differentiating between real and false end-of-film signals.

Another type of device for detecting the end of a film to effect automatic rewind is shown in U.S. Pat. No. 3,460,889 which issued on Aug. 12, 1969 in the name of Theo Wilharm. In that device, the trailing end of the film is also attached to the hub of a supply reel so that when the end of the film has been reached, the trailing portion of the film will be moved from a position tangent to the hub to a position extending radially from the hub. When this occurs, the film engages a sensing lever to trigger the rewind mechanism. The sensing lever is positioned on the projector so that it is normally disengaged from the film when at least a portion of the film is convoluted on the hub and is engaged by the film when the film extends radially from the hub. While the mechanism shown in the Wilharm patent appears to be suitable for its intended purpose, it is possible that a false rewind signal may be generated should the film unwinding from the reel catch on the reel flanges and be moved thereby to a position engaging the sensing lever.

SUMMARY OF THE INVENTION

It is an object of the present invention to provide a web handling apparatus with a device for effecting automatic rewind in response to the simultaneous occurrence of two different physically detectable conditions indicative of the fact that the end of the film has been reached.

In accordance with the above object, I have provided a device for effecting automatic rewind wherein a first sensing means is movable from an inactive position to an active position by an increase in the tension of a web being unwound from a hub and a second sensing means movable from an inactive position to an active position by the trailing end portion of the web moving to a position extending radially from the hub. Means are responsive to the first and second sensing means being in their respective active positions simultaneously for placing the apparatus in a rewind condition. Should one of the sensing means be moved to its active position unaccompanied by the other sensing means, the device will ignore the signal and the web will continue to be unwound from the core.

The invention, and its objects and advantages will become more apparent in the detailed description of the preferred embodiment presented below.

BRIEF DESCRIPTION OF THE DRAWING

In the detailed description of the preferred embodiments of the invention presented below, reference is made to the accompanying drawing, in which.

DESCRIPTION OF THE PREFERRED EMBODIMENT

Figure 1:
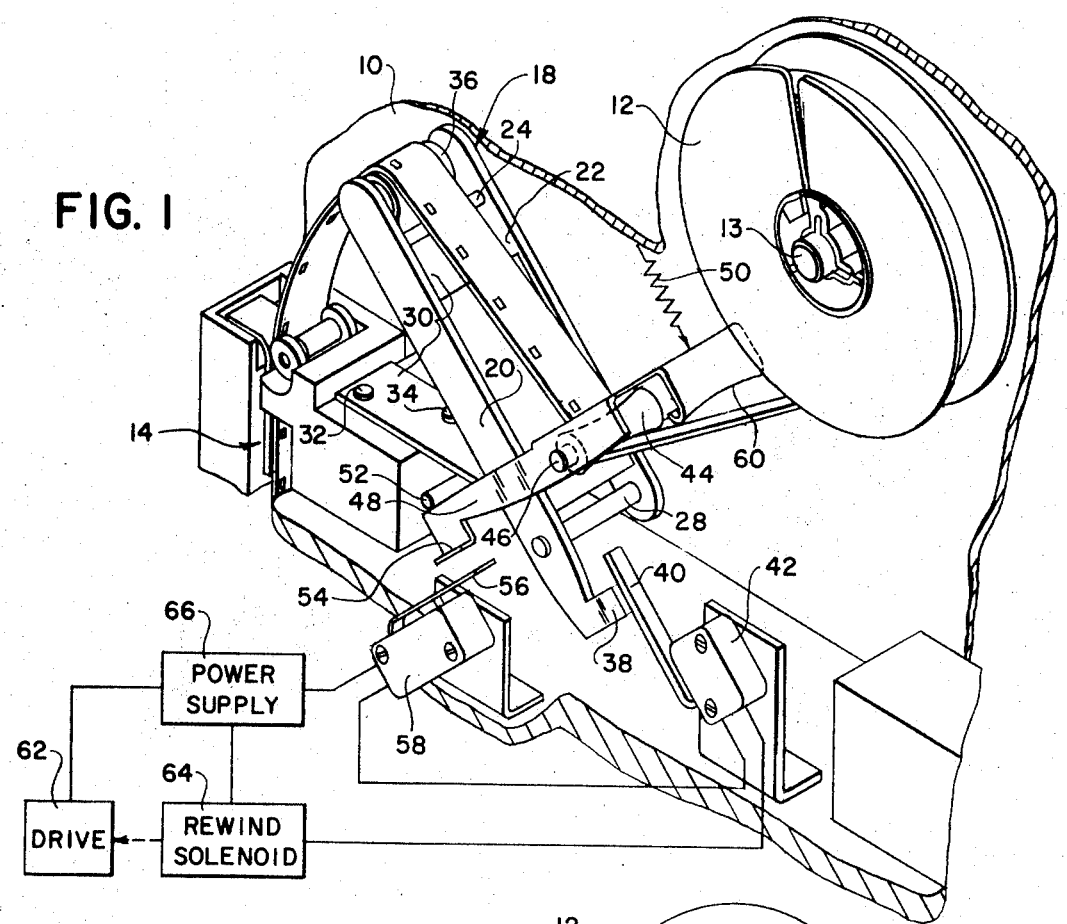
FIG. 1 is a perspective view of a portion of a motion picture projector incorporating the features of the present invention.

The embodiment of the present invention which is described herein incorporates the invention in a motion picture projection apparatus. However, it will be understood by those skilled in the art that the invention is equally suitable for use in other types of apparatus for advancing web material from a supply roll wherein it is desired to provide for automatically rewinding the web onto the supply roll. Because motion picture projectors are well known, the present description will be directed in particular to elements forming part of, or cooperating more directly with, apparatus in accordance with the present invention. It is to be understood that projector elements not especially shown or described may take various forms well known to those skilled in the art.

Referring to the drawing, I have shown a portion of a motion picture projector including a portion of a housing 10 upon which a supply reel 12 may be rotatably supported on a spindle 13. The supply reel contains a roll of perforated motion picture film, the trailing end of which extends through a slot in the hub of the reel and is anchored to the hub by a pin, not shown. An example of such a reel is disclosed in coassigned U.S. Pat. No. 3,506,212 which issued Apr. 14, 1970 in the name of James J. Wenskus.

Figure 2:
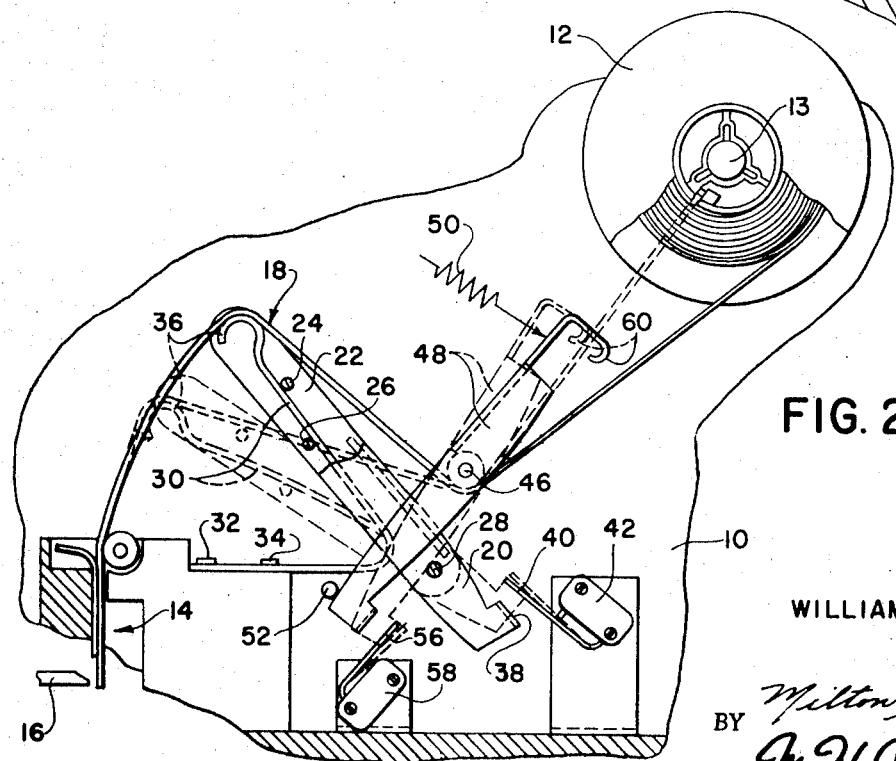
FIG 2 is an elevational view showing the portion of the projector shown in FIG. 1.

The projector has an operating station or film gate 14 through which the film may be threaded. At the film gate, the film is intermittently advanced in a known manner by a pull-down mechanism of which a pull-down claw member 16 is shown in FIG. 2.

A film snubbing member 18 for isolating forces placed on the film at reel 12 from the film at gate 14 includes a pair of parallel arms 20 and 22 which are joined together by a pair of pins 24 and 26 and which are pivotally mounted on the projector housing by a stud 28. A leaf spring 30 is mounted on the projector housing by a pair of studs 32 and 34 and passes between pins 24 and 26. One end of leaf spring 30 is curved at 36 to form a guide surface for the film. In its unstressed condition, leaf spring 30 holds snubber 18 in the position shown in full lines in FIG. 2. At the lower end of arm 20 of snubber 18, a bent portion forms a tab 38 which is aligned with a blade 40 of a normally open electrical switch 42.

A roller 44 is rotatably mounted on housing 10 by a stud 46 for guiding the film along a predetermined path between supply reel 12 and bent portion 36 of leaf spring 30. Also rotatably mounted on stud 46 is a lever 48 which is urged in a clockwise direction as viewed in FIG. 2 by a spring 50 against a stop 52 so as to normally assume the full line position shown in FIG. 2. The bottom portion of lever 48 is bent to form a tab 54 which is aligned with a blade 56 of a second normally open electrical switch 58. The top of lever 48 is curved at 60 to form a smooth surface for engaging the reach of film between supply reel 12 and roller 44.

I have schematically shown at 62 drive means which may be selectively coupled to either the take-up reel, not shown, or to spindle 13 for supply reel 12 for rotating the reel coupled thereto in a direction to wind film thereon. Such a drive means is disclosed in aforementioned U.S. Pat. No. 3,300,155 normally coupled to the take-up reel and is disengaged therefrom and engaged with the supply reel when a rewind solenoid 64 is energized by a power supply 66 when switches 42 and 58 are both closed.

OPERATION

To project a roll of film, a supply reel such as shown at 12 is mounted on spindle 13 and the leading end of the film is threaded under roller 44, around bent portion 36 of leaf spring 30 and into gate 14. The film is intermittently advanced through the gate by pull-down claw 16 and is wound onto a take-up reel, not shown. While the film is being projected, the pull-down claw will unwind film from the supply reel. Because of the inertial forces on the supply reel, the tension of the reach of film between that reel and the gate will momentarily increase with each pull-down stroke. To isolate this tension from the film in the gate, leaf spring 30 will be flexed by film tension to rotate film snubber 18 in a counterclockwise direction about stud 28 as the film is advanced through the gate. Between advancing strokes, leaf spring 30 will return the film snubber to its full line position shown in FIG. 2. Should the inertial forces on the supply reel be abnormally high the film tension may be sufficient to rotate snubber 18 to its phantom line position shown in FIG. 2, thereby closing switch 42. However, since switch 58 is not closed at that time, rewind solenoid 64 will not be energized and the projector will not be placed in its rewind mode.

Referring to FIG. 2, bent portion 60 of lever 48 is positioned by spring 50 and stop 52 so that the reach of film between supply reel 12 and roller 44 does not contact the bent portion as long as the film is convoluted about the hub of the reel. As the last convolution of film is unwound from the reel, it will be pulled to a position extending radially from the reel hub. In this condition, the reach of film last referred to will be moved against bent portion 60 to rotate lever 48 in a counterclockwise direction as viewed in FIG. 2 to its phantom line position in which tab 54 moves blade 56 to close switch 58. Simultaneously, pull-down claw 16 tensions the film between the supply reel and the gate so that film snubber 18 is moved to its phantom line position shown in FIG. 2. Tab 38 will move blade 40 to close switch 42. The closure of switches 42 and 58 will connect power supply 66 to rewind solenoid 64 to disengage drive means 62 from the take-up reel and to couple the drive means to supply reel 12, thereby initiating the rewind mode of the projector. At this time, pull-down claw 16 is disabled by suitable means well known to those skilled in the art and film gate 14 may be opened to relive the pressure on the film.

It may be seen that by the mechanism shown, the rewind operation of the projector will be initiated only when switches 58 and 42 are closed. Since switch 42 is closed by an increase in film tension between the supply reel and the gate and since switch 58 is closed when the reach of film between the supply reel and roller 44 assumes a radial position with respect to the supply reel, a momentary increase with the film tension which could be caused by high inertial forces on the supply reel will not initiate film rewind as long as there is a convolution of film wrapped about the hub of reel 12 since switch 58 will not be closed. Similarly, should the film catch on the reel flanges as it is being unwound and thereby be moved to a position to engage bent portion 60 of lever 48 and to rotate the lever counterclockwise to close switch 58 (or should lever 48 be accidentally rotated during film threading), the projector will not go into rewind because switch 42 has not been closed by an increase in the film tension signifying the end of the film roll.

The invention has been described in detail with particular reference to preferred embodiments thereof, but it will be understood that variations and modifications can be effected within the spirit and scope of the invention.

I claim:

1. A device for effecting automatic rewind in a web handling apparatus of the type having (1) a housing, (2) means on said housing for rotatably supporting a hub having a web of strip material wound thereon with the innermost end of the web anchored to the hub, and (3) drive means having a first condition for unwinding the web from the hub and a second condition for rotating the hub to rewind the web thereabout, said device comprising first and second means for respectively sensing different physically detectable conditions indicative of the fact that the web has been completely unwound from said hub, said first and second means being operatively connected to said drive means for placing said drive means in its second condition when both of said conditions have been sensed by said first and second means substantially simultaneously.

2. A device for effecting automatic rewind in a web handling apparatus of the type having (1) a housing, (2) means on said housing for rotatably supporting a hub having a surface upon which a web of strip material may be wound with the innermost end of the web anchored to the hub so that least a portion of the web extends substantially radially from the hub when the web has been completely unwound therefrom, and (3) drive means having a first condition for unwinding the web from the hub and a second condition for rotating the hub to rewind the web thereabout, said device comprising:
- a first member mounted on said housing for movement between a first position and a second position;
- means resiliently urging said first member toward its first position;
- means for moving said first member to its second position in response to an increase in the tension of the web;
- a second member mounted on said housing for movement between a first position and a second position;
- means resiliently urging said second member toward its first position;
- means actuatable by said portion of the web extending radially from the hub for moving said second member to its second position; and
- means responsive to said first and second member being in their respective second positions simultaneously for placing said drive means in its second condition.

3. A device as defined in claim 2 wherein said second member comprises:
- means for guiding that portion of the web which is being unwound from said hub, said guide means being spaced from said hub supporting means;
- a lever having a portion disposed between said guide means and said hub supporting means in such position that said lever portion (1) is bypassed by said web portion when it extends tangentially from said hub and (2) is engaged by said web portion when such portion extends radially from said core.

4. A device as defined in claim 3 wherein said lever is mounted on said housing for movement between a first position whereat said lever portion would interfere with said web portion extending radially from said hub toward said guide means and a second position whereat said lever portion is out of the path of said web portion when said web portion extends radially from said hub, and further comprising spring means for urging said lever toward its first position.

5. A device as defined in claim 4 wherein said means for placing said drive means in its second condition comprises means for detecting movement of said lever to its second position and for creating an electrical signal in response thereto.

6. A device for effecting automatic rewind in a web handling apparatus of the type having (1) a housing, (2) means on said housing for rotatably supporting a hub upon which a web having opposed surfaces may be wound with the innermost end of the web anchored to the hub so that at least a portion of the web extends substantially radially from the hub when the web has been completely unwound therefrom, (3) means on said housing for defining a guide path for the web unwound from the hub, (4) means for advancing the web along said guide path from the hub and (5) means actuatable for rotating the hub to rewind the web thereabout, said device comprising:
- first sensing means engageable by one surface of the web and actuatable by an increase in the tension of the web between the hub and said web advancing means above a predetermined value for producing a first signal;
- second sensing means engageable by the other surface of the web and actuatable by said portion of the web extending radially from the hub for producing a second signal; and
- means responsive to said first and second signals occurring substantially simultaneously for actuating said rewind means.

7. A device as defined in claim 6 wherein said second sensing means comprises:
- means for guiding that portion of the web which is being unwound from said hub, said guide means being spaced from said hub supporting means; and
- detecting means responsive to movement of said web portion to said radial position for producing said second signal, said detecting means being disposed between said guide means and said hub supporting means in such position that it is bypassed by said web portion when it extends tangentially from said hub and is engaged by said web portion when such portion extends radially from said hub.

* * * * *